(12) United States Patent
Walter

(10) Patent No.: US 10,240,667 B2
(45) Date of Patent: Mar. 26, 2019

(54) CVT DRIVE TRAIN

(71) Applicant: SCHAEFFLER TECHNOLOGIES AG & CO. KG, Herzogenaurach (DE)

(72) Inventor: Bernhard Walter, Oberkirch-Haslach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/102,840

(22) PCT Filed: Nov. 28, 2014

(86) PCT No.: PCT/DE2014/200662
§ 371 (c)(1),
(2) Date: Jun. 8, 2016

(87) PCT Pub. No.: WO2015/086016
PCT Pub. Date: Jun. 18, 2015

(65) Prior Publication Data
US 2016/0312869 A1   Oct. 27, 2016

(30) Foreign Application Priority Data
Dec. 9, 2013 (DE) .......... 10 2013 225 294

(51) Int. Cl.
*F16H 37/02* (2006.01)
*F16H 37/08* (2006.01)

(52) U.S. Cl.
CPC ......... *F16H 37/022* (2013.01); *F16H 37/021* (2013.01); *F16H 37/0813* (2013.01);
(Continued)

(58) Field of Classification Search
CPC ................. F16H 37/021; F16H 37/022; F16H 2037/023; F16H 2037/025;
(Continued)

(56) References Cited

U.S. PATENT DOCUMENTS 4,682,518 A * 7/1987 Takada .................. F16H 37/022
475/209
5,669,846 A * 9/1997 Moroto ............... F16H 37/0846
475/211
(Continued)

FOREIGN PATENT DOCUMENTS

BR 112013019108 A2 10/2016
CN 102139627 A 8/2011
(Continued)

OTHER PUBLICATIONS

International Search Report for International Application No. PCT/DE2014/200662.
(Continued)

*Primary Examiner* — David R Morris
(74) *Attorney, Agent, or Firm* — Kevin L. Parks

(57) ABSTRACT

A CVT drive train having an input drive, a start-up element, a continuously variable variator, and a differential. A direct shifting stage bridges the variator and is connected directly to the input drive. The direct connection of the direct shifting stage to the input drive enables the direct shifting stage to be used advantageously independently of the start-up element and can be connected, for example, to a gear that is used in conventional CVT drive trains to drive a hydraulic pump.

15 Claims, 4 Drawing Sheets

(52) U.S. Cl.
CPC .. *F16H 2037/023* (2013.01); *F16H 2037/025* (2013.01); *F16H 2037/026* (2013.01); *F16H 2200/0008* (2013.01); *F16H 2200/0034* (2013.01); *F16H 2200/2005* (2013.01); *F16H 2200/2038* (2013.01)

(58) Field of Classification Search
CPC ....... F16H 2037/026; F16H 2200/0008; F16H 2200/0034; F16H 2200/2005; F16H 2200/2038
See application file for complete search history.

(56) References Cited

U.S. PATENT DOCUMENTS

| | | | | |
|---|---|---|---|---|
| 5,846,152 | A * | 12/1998 | Taniguchi | F16H 37/0846 475/210 |
| 7,493,203 | B2 * | 2/2009 | Bitzer | F16H 37/084 477/107 |
| 8,257,216 | B2 * | 9/2012 | Hoffman | F16H 37/086 475/207 |
| 9,546,720 | B2 * | 1/2017 | Janson | F16H 37/022 |
| 9,664,278 | B2 * | 5/2017 | Toyoda | F16H 37/022 |
| 9,732,834 | B2 * | 8/2017 | Natsume | F16H 39/00 |
| 9,791,028 | B2 * | 10/2017 | Walter | F16H 37/022 |
| 9,909,657 | B2 * | 3/2018 | Uchino | F16H 37/021 |
| 2001/0008192 | A1 * | 7/2001 | Morisawa | B60K 6/46 180/197 |
| 2005/0227809 | A1 * | 10/2005 | Bitzer | F16H 37/084 477/37 |
| 2006/0276295 | A1 | 12/2006 | Gitt | |
| 2007/0199396 | A1 * | 8/2007 | Taniai | F16H 61/0009 74/335 |
| 2010/0075799 | A1 * | 3/2010 | Suzuki | F16H 61/0437 477/44 |
| 2011/0172051 | A1 * | 7/2011 | Hoffman | F16H 37/086 475/207 |
| 2011/0308909 | A1 * | 12/2011 | Ohashi | F16D 25/0638 192/3.25 |
| 2011/0312465 | A1 * | 12/2011 | Ohashi | F16H 37/022 475/59 |
| 2013/0196816 | A1 * | 8/2013 | Natsume | B60K 6/48 477/3 |
| 2013/0196817 | A1 * | 8/2013 | Miyazaki | B60K 6/26 477/5 |
| 2013/0217539 | A1 * | 8/2013 | Natsume | B60K 6/48 477/52 |
| 2014/0315676 | A1 * | 10/2014 | Janson | F16H 37/022 475/212 |
| 2014/0316625 | A1 * | 10/2014 | Yoshikawa | B60W 20/40 701/22 |
| 2015/0133257 | A1 * | 5/2015 | Uchino | F16H 37/022 475/210 |
| 2015/0167802 | A1 * | 6/2015 | Yoshida | F16H 37/022 475/211 |
| 2015/0337931 | A1 * | 11/2015 | Walter | F16H 37/022 475/210 |
| 2016/0131256 | A1 * | 5/2016 | Toyoda | F16H 37/022 701/51 |
| 2016/0290457 | A1 * | 10/2016 | Walter | F16H 37/022 |
| 2016/0305520 | A1 * | 10/2016 | Walter | F16H 61/662 |
| 2016/0305521 | A1 * | 10/2016 | Walter | F16H 37/022 |
| 2016/0347165 | A1 * | 12/2016 | Walter | B60K 6/387 |
| 2017/0023113 | A1 * | 1/2017 | Walter | F16H 37/022 |

FOREIGN PATENT DOCUMENTS

| | | | | |
|---|---|---|---|---|
| CN | 102518769 A | | 6/2012 | |
| CN | 103492751 A | | 1/2014 | |
| DE | 102 61 990 A1 | | 2/2004 | |
| EP | 2 275 709 A1 | | 1/2011 | |
| JP | 4912019 B2 | | 4/2012 | |
| JP | WO 2013175582 A1 | * | 11/2013 | ........... F16H 37/022 |
| WO | 2007043875 A1 | | 4/2007 | |
| WO | WO 2007/043875 A1 | | 4/2007 | |

OTHER PUBLICATIONS

International Preliminary Report on Patentability for International Application No. PCT/DE2014/200662.

* cited by examiner

CVT DRIVE TRAIN

CROSS-REFERENCE TO RELATED APPLICATION

This application is the U.S. national phase application under 35 U.S.C. § 371 of International Application Serial No. PCT/DE2014/200662, having an international filing date of 28 Nov. 2014, and designating the United States, which claims priority based upon German Patent Application No. DE 10 2013 225 294.3, filed on 9 Dec. 2013, the entire contents of each of which applications are hereby incorporated by reference herein to the same extent as if fully rewritten.

BACKGROUND OF THE INVENTION

Field of the Invention

The present invention relates to a CVT drive train having a drive, a start-up element, a continuously variable variator, and a differential. In addition, the invention relates to a method for operating such a CVT drive train.

Description of the Related Art

The term CVT refers to a stepless transmission; the letters CVT stand for continuously variable transmission. To increase the transmission ratio range of a stepless transmission—its gear ratio spread—it is known from European published application EP 2 275 709 A1 to position a planetary transmission after the stepless transmission. The controllable planetary transmission enables two-range shifting and shifting into reverse. In addition, it is known from German published application DE 102 61 900 A1 to provide a multi-range CVT with fixed engageable gears, for example for moving off or for top speed; however, when these fixed transmission ratios are in operation, the variator is uncoupled. Consequently there is only one stepless range; stepless operation is not possible in all driving ranges.

An object of the present invention is to simplify the construction and/or the operation of a CVT drive train having an input drive, a start-up element, a continuously variable variator, and a differential.

SUMMARY OF THE INVENTION

The above-stated object is fulfilled in a CVT drive train having an input drive, a startup element, a continuously variable variator, and a differential, in that a direct shifting stage that bridges the variator is connected directly to the input drive. The direct connection of the direct shifting stage to the input drive enables the direct shifting stage to be used advantageously independently of the start-up element. The direct shifting stage can be connected, for example, to a gear that is used in conventional CVT drive trains to drive a hydraulic pump. Such a gear is therefore also referred to as a pump gear. If the input drive includes a combustion machine or an internal combustion engine, then the direct shifting stage that bridges the variator is driven directly by the combustion machine or the internal combustion engine. Because of the direct connection of the direct shifting stage to the input drive, the direct shifting stage is preferably used within the framework of the present invention exclusively in the driving operation of a motor vehicle equipped with the CVT drive train.

A preferred exemplary embodiment of the CVT drive train is characterized in that the direct shifting stage that bridges the variator is connected to a crankshaft with an interposed torsional vibration damper. A torque of the input drive, in particular of the combustion machine or the internal combustion engine, is delivered by means of the crankshaft. The torsional vibration damper serves to uncouple from the CVT drive train unwanted torsional vibrations that occur during operation of the input drive, in particular the combustion machine or the internal combustion engine. That prevents unwanted damage to the CVT drive train caused by rotational non-uniformities.

Another preferred embodiment of the CVT drive train is characterized in that the direct shifting stage includes an intermediate gear stage that meshes with a spur gear of the differential. The intermediate gear stage includes at least one gear that is non-rotatably connected to the input drive, in particular a pump gear, and meshes with the spur gear of the differential. The direct shifting stage includes a jaw clutch, for example, as the switching device. However, the direct shifting stage can possibly also be equipped with a synchronizing device.

Another preferred exemplary embodiment of the CVT drive train is characterized in that a sub-transmission is positioned between the variator and the differential. The sub-transmission is, for example, a step-down gear. The sub-transmission is preferably positioned between a variator output and the differential. The direct shifting stage, on the other hand, is preferably positioned between the start-up element and a variator input.

Another preferred exemplary embodiment of the CVT drive train is characterized in that the sub-transmission is implemented as a fixed-stage transmission with a forward branch and a reverse branch. Furthermore, the fixed-stage transmission advantageously includes a neutral position in which the variator is decoupled from the output drive. The forward branch serves advantageously to enable the forward driving operation of a motor vehicle equipped with the CVT drive train. Analogously, the reverse branch enables the rearward driving operation of the motor vehicle.

Another preferred exemplary embodiment of the CVT drive train is characterized in that the sub-transmission is implemented as a dual-range transmission, in particular as a planetary transmission. The dual-range transmission makes driving operation possible, for example, in a first range, which is also referred to as the low range, and in a second range, which is also referred to as the high range. In the first range it is possible, for example, to drive with a higher transmission ratio than in the second range. Furthermore, the dual-range transmission in the form of a planetary transmission advantageously makes it possible to provide a reverse gear.

Another preferred exemplary embodiment of the CVT drive train is characterized in that the start-up element is implemented as a torque converter or as a starting clutch. It is important here that the drive is able to be connected directly to the direct shifting stage that bridges the variator, independently of the design of the start-up element. With a starting clutch, it can be realized in a simple manner, for example, that the direct shifting stage that bridges the variator is non-rotatably connected to an input of the starting clutch. When the start-up element is designed as a torque converter, the direct linking to the input drive of the direct shifting stage that bridges the variator to the input drive can be accomplished, for example, by means of a converter housing. A decoupling clutch integrated into the torque converter makes it possible to decouple the start-up element from the variator. The decoupling clutch integrated into the torque converter makes it possible to shut off the variator, so to speak. In the version with the starting clutch, the variator can be decoupled from the drive or shut off by the starting clutch.

Another preferred exemplary embodiment of the CVT drive train is characterized in that the start-up element, the variator, the sub-transmission, the direct shifting stage, and the differential are arranged in front-transverse construction. The terms front and transverse refer to the location where the named components are installed in a motor vehicle. Front means that the input drive, along with the start-up element, the variator, the sub-transmission, the direct shifting stage, and the differential, are positioned in a front area or forward area of the motor vehicle. Transverse means that the drive, together with the named components, is installed transversely in the motor vehicle. In that case, the input drive and the named components, in particular the variator and the sub-transmission, are arranged side-by-side in the transverse direction of the motor vehicle.

According to another exemplary embodiment, the direct shifting stage is positioned beneath a crankshaft center point. At the same time, the direct shifting stage is positioned in the direction of the differential.

In a method for operating a previously described CVT-drive train, the object stated above is fulfilled, alternatively or in addition, by the direct shifting stage being used at an operating point that is relevant for fuel consumption, for driving with favorable fuel consumption. To that end, the direct shifting stage can be used, for example, at a final transmission ratio point. Alternatively, or in addition, the direct shifting stage can be used for a change of range at a predetermined transmission ratio. This means that the direct shifting stage is used for a change of range while the transmission ratio is always the same.

In addition, the invention relates to a start-up element, a variator, a sub-transmission, a direct shifting stage, and a differential for a CVT drive train described earlier. Alternatively, or in addition, the invention also relates to a transmission having a continuously variable variator and a direct shifting stage that bridges the variator. The transmission can also include a previously described start-up element and/or a previously described differential.

BRIEF DESCRIPTION OF THE DRAWINGS

Additional advantages, features and details of the invention can be seen from the following description, in which various exemplary embodiments are described in detail with reference to the drawings. The drawing figures show the following.

DESCRIPTION OF THE PREFERRED EMBODIMENTS

Figure 1:
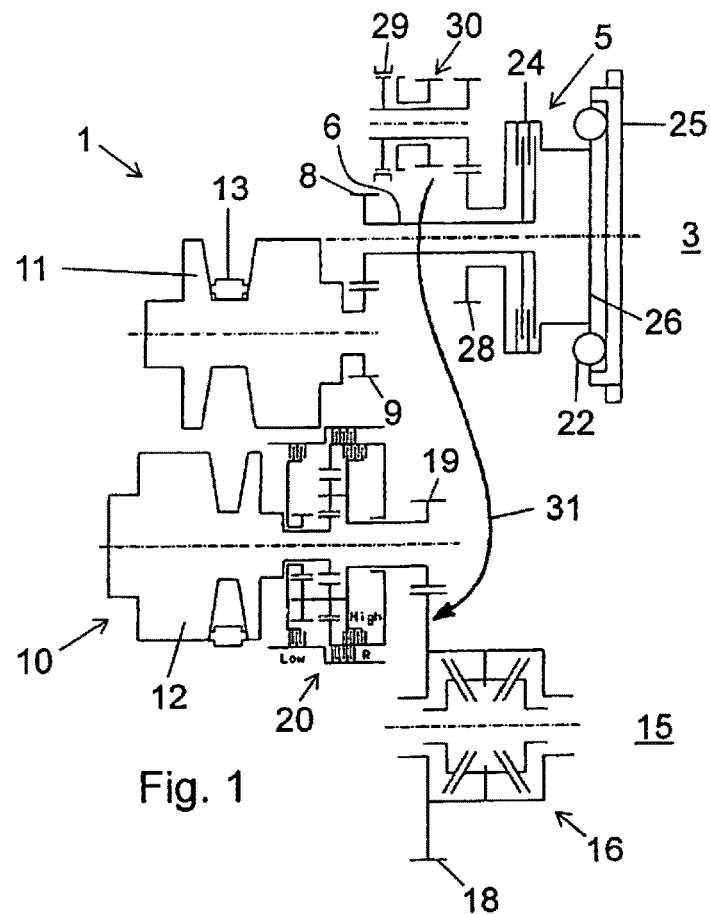
FIG. 1 shows a simplified illustration of a CVT drive train according to a first exemplary embodiment of the present invention and in longitudinal section.

FIGS. 1 through 4, 7, and 8 show simplified representations of CVT drive trains 1; 41; 71 in various exemplary embodiments and in transverse views. The same reference numerals are used to identify the same or similar parts. The following section examines first the common features of the various exemplary embodiments. After that, the differences between the individual exemplary embodiments will be explained.

The CVT drive trains 1; 41; 71 include an input drive 3. The input drive is, for example, a combustion machine, which is also referred to as an internal combustion engine when used in a motor vehicle. The CVT drive train 1; 41; 71 is used in motor vehicles.

Figure 7:
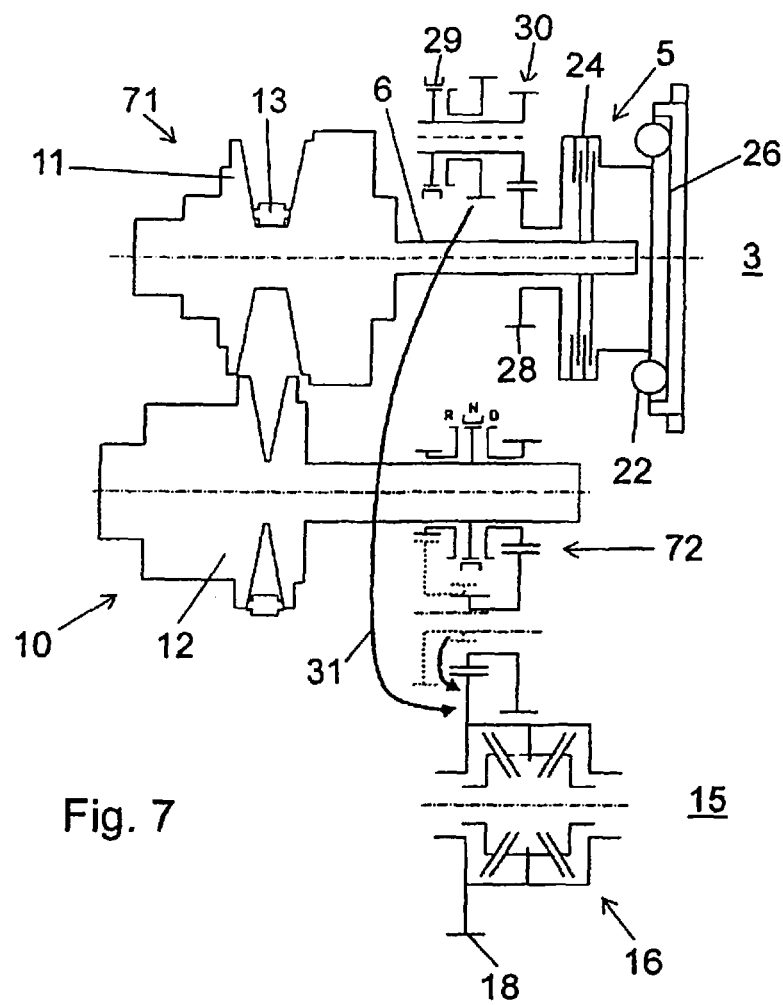
FIG. 7 shows a CVT drive train similar to that shown in FIG. 1, with a sub-transmission designed as a fixed-stage transmission.

A start-up element 5 makes it possible to move the motor vehicle off. A torque is forwarded from the input drive 3 to a start-up output part 6 through the start-up element 5. The start-up output part 6 is connected to a variator input of a variator 10 through a gear stage having a gear 8 and a gear 9. FIG. 7 shows that the start-up output part 6 can also be connected directly to the variator input. In FIG. 7, the gear stage 8, 9 is omitted.

The variator 10 includes a conical disk set 11 on the drive side and a conical disk set 12 on the output side. The two conical disk sets 11, 12 are coupled with each other by an endless torque-transmitting means 13, which is only suggested. The endless torque-transmitting means 13 is, for example, a special chain.

By means of the two conical disk sets 11 and 12, the transmission ratio between the input drive 3 and an output 15 can be varied continuously. The output 15 includes at least one driven wheel (not shown).

Normally, the output 15 includes at least two driven wheels. An equalizing transmission, also referred to as a differential 16, serves to distribute the provided torque to the two driven wheels. The differential 16 includes a spur gear 18.

The spur gear 18 of the differential 16 meshes with a sub-transmission output gear 19 of a sub-transmission 20. The sub-transmission 20 is operatively connected to a variator output on the output-side conical disk set 12.

A torsional vibration damper 22 is operatively connected to the input drive 3 of the CVT drive trains 1; 41; 71. The torsional vibration damper 22 is positioned between the input drive 3 and the start-up element 5. In FIGS. 1, 2, and 7, 8 the start-up element 5 is designed as a start-up clutch 24. The start-up clutch 24 is a wet-running multi-plate clutch.

Figure 3:
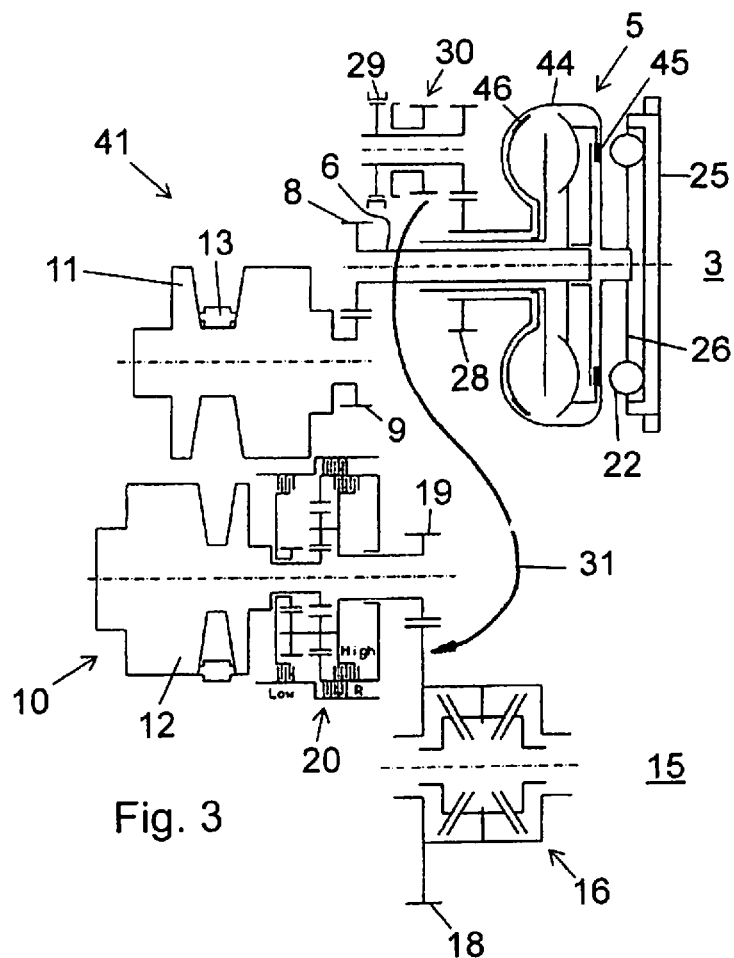
FIG. 3 shows a CVT drive train similar to that shown in in FIG. 1, with a torque converter as a start-up element.
Figure 4:
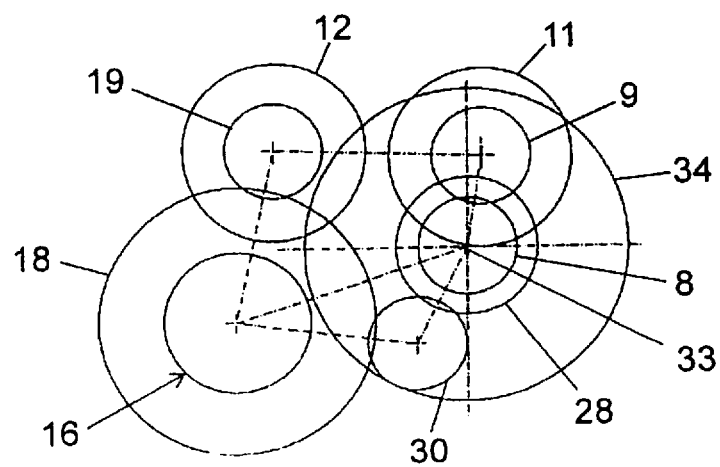
FIG. 4 shows the CVT drive train shown in FIG. 3 in a transverse view.

In the CVT drive train 41 shown in FIGS. 3 and 4, the start-up element 5 is designed as a torque converter 44 with a torque converter lockup clutch 45 and a decoupling clutch 46.

An input part 25 of the torsional vibration damper 22 is non-rotatably connected to a crankshaft of the input drive 3. An output part 26 of the torsional vibration damper 22 represents, on the one hand, an input of the start-up clutch 24 or torque converter 44. On the other hand, the output part 26 of the torsional vibration damper 22 is non-rotatably connected to a gear 28. The gear 28 serves, for example, to drive a pump (not shown). The gear 28 is therefore also referred to as a pump gear. However, the gear 28 can also serve to drive a different or an additional vehicle component.

According to one essential aspect of the invention, a direct shifting stage 30 which is switchable with the aid of a switching device 29 is operatively connected to the gear 28. An arrow 31 indicates that the direct shifting stage 30 serves to bridge the variator 10. As indicated by the arrow 31, with the aid of the switching device 29 the direct shifting stage 30 can provide a direct coupling of the gear 28 to the spur gear 18 of the differential 16. With the aid of the direct shifting stage 30, the input drive 3 can be connected as a drive through the torsional vibration damper 22 to the output drive 15, independently of the start-up element 5 and the variator 10, to the differential 16.

Figure 2:
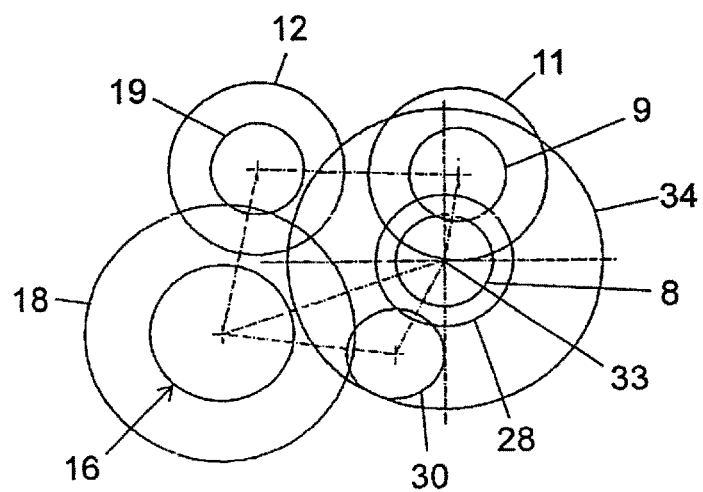
FIG. 2 shows a diagram of the CVT drive train shown in FIG. 1 in a transverse view.

In FIG. 2, an axis of rotation 33 of the crankshaft runs perpendicular to the plane of the drawing. A circle 34 indicates a starter ring gear that is non-rotatably connected to the crankshaft. A radially inner circle represents the gear 8 of FIG. 1. Another circle represents the gear 28, also referred to as a pump gear. Gear 8 meshes with gear 9, which represents the variator input. Gear 9 is operatively connected to the drive-side conical disk set 11, which is likewise shown in FIG. 2 as a circle. A circle 12 indicates the output-side conical disk set. The sub-transmission output gear 19 meshes with the spur gear 18, which is likewise indicated by a circle.

The circles in FIG. 2 illustrate the front-transverse construction. In FIG. 2, the direct shifting stage 30 is positioned below the axis 33 of the crankshaft and in the direction of the spur gear 18 of the differential 16. Front-transverse construction means that the input drive 3, in particular the internal combustion engine, and the transmission, here the variator 10 and the sub-transmission 20, are positioned next to each other in the transverse direction of the vehicle, for example in front of or above a front axle.

In FIGS. 1 through 4, the sub-transmission 20 is a planetary transmission having two planetary gear sets and two plate assemblies. The sub-transmission 20 in the form of a planetary transmission makes it possible to switch between a first range low and a second range high. Furthermore, the sub-transmission 20 serves to provide a reverse gear R.

Figure 5:
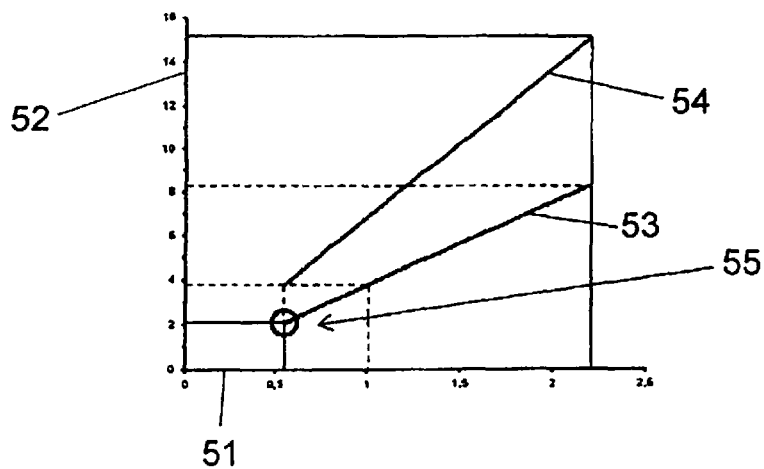
FIG. 5 is a transmission ratio characteristic map of the CVT drive train according to a first exemplary embodiment of a method according to the invention.
Figure 6:
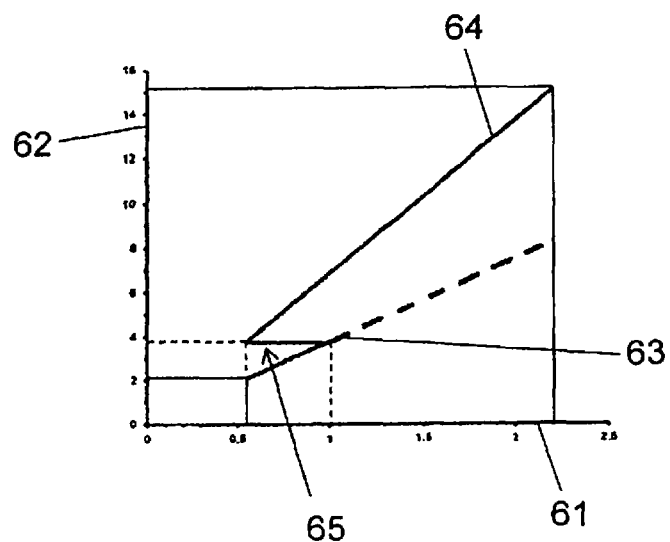
FIG. 6 is a transmission ratio characteristic map similar to that of FIG. 5 according to a second exemplary embodiment of the method according to the invention.

FIGS. 5 and 6 show two possible transmission ratio characteristic maps for operation of the CVT drive trains 1 and 41 shown in FIGS. 1 through 4. The transmission ratio characteristic maps are designed as Cartesian coordinate diagrams having a respective x-axis 51; 61 and a respective y-axis 52; 62. A variator transmission ratio is plotted on the x-axes 51; 61. A sub-transmission transmission ratio is plotted on the y-axes 52; 62. The variator transmission ratio is the transmission ratio of the variator (component 10 in FIGS. 1 through 4). The sub-transmission transmission ratio is the transmission ratio of the sub-transmission (component 20 in FIGS. 1 through 4).

An upper characteristic curve 54; 64 serves in FIGS. 5 and 6, respectively, to represent the first operating range, which is also referred to as the low range. A lower characteristic curve 53; 63 serves in FIGS. 5 and 6, respectively, to represent the second operating range, which is also referred to as the high range. The low range 54; 64 begins at a variator transmission ratio of somewhat above 0.5 and a sub-transmission transmission ratio of somewhat below four. The high range begins at the same variator transmission ratio as in the low range. However, the high range begins at a sub-transmission transmission ratio of somewhat above two.

The transmission ratio characteristic map shown in FIG. 5 shows that the direct switching stage (component 30 in FIGS. 1 through 4), which can also be referred to as the constant stage, is used at an operating point 55 that is relevant for fuel consumption, for driving with favorable fuel consumption. The operating point 55 corresponds in FIG. 5 to a final transmission ratio in the high range 53.

At operating point 55 in the driving operation of a motor vehicle equipped with the CVT drive trains 1: 41, it is possible with the direct switching stage 30 to switch over in such a way that the output drive is connected as a drive directly to the differential, as indicated by the arrow 31 in FIGS. 1 and 3.

The variator (component 10 in FIGS. 1 and 3) can then be shut off. By shutting off the variator, it is possible, for example, to reduce fuel consumption. With the variator shut off, the CVT drive trains 1; 41 are driven at a constant transmission ratio by the direct switching stage 30.

In FIG. 6, a horizontal line 65 that extends parallel to the x-axis 61 shows that the direct switching stage or constant stage (component 30 in FIGS. 1 and 3) can also be used to switch over between the low range 64 and the high range 63 while the transmission ratio remains the same. The switchover line 65 by the direct switching stage always takes place at a transmission ratio of somewhat below four.

Figure 8:
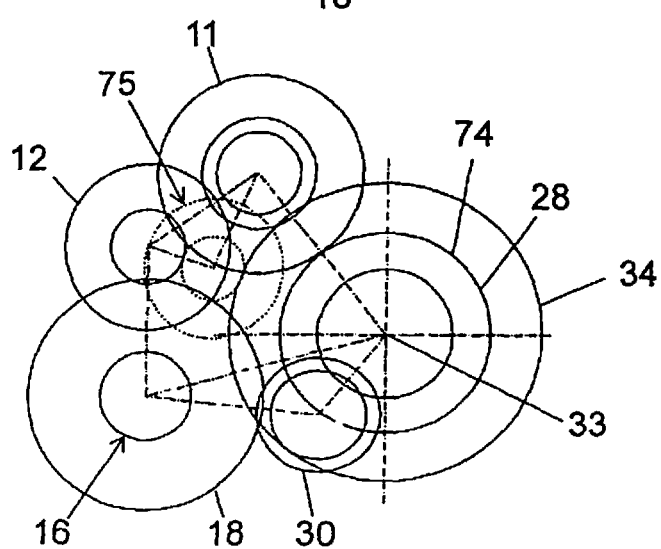
FIG. 8 shows the CVT drive train shown in FIG. 7 in a transverse view.

The CVT drive train 71 shown in FIGS. 7 and 8 differs from the CVT drive train 1 shown in FIG. 1 only in the design of the sub-transmission 72. In FIG. 7, the sub-transmission 72 is designed as a fixed-stage transmission with a forward branch D and a reverse branch R. Between the forward branch D and the reverse branch R, a neutral position is indicated by a capital N. The sub-transmission 72, together with the variator 10, can be bridged over by the direct switching stage 30, as indicated by the arrow 31.

In the transverse view of the CVT drive train 71 shown in FIG. 8, a conical pulley drive of the drive-side conical disk set 11 of the variator 10 is indicated by a circle 74. Dashed circle 75 shows the representation of a reverse gear with the sub-transmission 72.

What is claimed is:

1. A continuously variable transmission (CVT) drive train, the CVT drive train comprising:
   an input drive;
   a torque converter;
   a continuously variable variator;
   a differential;
   a direct shifting stage that bridges the variator and that is connected to the input drive, wherein the direct shifting stage is configured to couple a pump gear to a spur gear of the differential via a switching device, wherein the pump gear is configured to drive a pump; and
   a torsional vibration damper positioned between the input drive and the torque converter, wherein an output of the torsional vibration damper is an input of the torque converter and is non-rotatably connected to the pump gear.

2. The CVT drive train according to claim 1, wherein the direct shifting stage which bridges the variator is connected to a crankshaft of the input drive.

3. The CVT drive train according to claim 1, wherein the direct shifting stage includes an intermediate gear stage that meshes with the spur gear of the differential.

4. The CVT drive train according to claim 1, wherein a sub-transmission is positioned between the variator and the differential.

5. The CVT drive train according to claim 4, wherein the sub-transmission is a fixed-stage transmission having a forward branch and a reverse branch.

6. The CVT drive train according to claim 5, wherein the torque converter, the variator, the sub-transmission, the direct shifting stage, and the differential are arranged in front-transverse construction in a motor vehicle.

7. The CVT drive train according to claim 4, wherein the sub-transmission is a dual-range transmission.

8. The CVT drive train according to claim 7, wherein the sub-transmission is a planetary transmission.

9. The CVT drive train according to claim 1, wherein the drive train is configured to utilize the direct shifting stage at an operating point that is relevant for fuel consumption, for driving with favorable fuel consumption.

10. The CVT drive train according to claim 1, wherein the drive train is configured to utilize the direct shifting stage for a change of operating range at a predetermined transmission ratio.

11. The CVT drive train according to claim 1, wherein the torque converter includes a lockup clutch and a decoupling clutch.

12. The CVT drive train according to claim 11, wherein the decoupling clutch is configured to decouple an input of the torque converter from an input of the continuously variable variator.

13. A continuously variable transmission (CVT) drive train, comprising:
an input drive;
a torque converter having a torque converter housing and including a lockup clutch and a decoupling clutch disposed within the torque converter housing;
a continuously variable variator;
a differential;
a direct shifting stage that bridges the continuously variable variator, wherein the direct shifting stage is connected to the input drive via the torque converter housing, wherein the direct shifting stage is configured to couple a pump gear to a spur gear of the differential via a switching device, the pump gear being configured to drive a pump; and
a torsional vibration damper positioned between the input drive and the torque converter, wherein an output of the torsional vibration damper is an input of the torque converter and is non-rotatably connected to the pump gear.

14. The CVT drive train according to claim 13, wherein the decoupling clutch is configured to disconnect the torque converter from the direct shifting stage.

15. The CVT drive train according to claim 13, wherein the decoupling clutch is configured to couple an input of the torque converter to an input of the continuously variable variator.

* * * * *